United States Patent [19]

Moser

[11] Patent Number: 5,417,956
[45] Date of Patent: May 23, 1995

[54] PREPARATION OF NANOPHASE SOLID STATE MATERIALS

[75] Inventor: William R. Moser, Hopkinton, Mass.

[73] Assignee: Worcester Polytechnic Institute, Worcester, Mass.

[21] Appl. No.: 931,765

[22] Filed: Aug. 18, 1992

[51] Int. Cl.$^6$ .............................................. C01B 13/36
[52] U.S. Cl. ..................... 423/592; 423/263; 423/593; 423/598; 423/608; 423/625; 423/632; 423/636
[58] Field of Search ............... 423/592, 593, 598, 608, 423/636, 625, 263, 632

[56] References Cited

U.S. PATENT DOCUMENTS

| | | |
|---|---|---|
| 2,457,091 | 1/1948 | Schlesman . |
| 2,487,284 | 10/1949 | Glassbrook et al. . |
| 2,968,652 | 1/1961 | Mertes . |
| 4,111,846 | 9/1978 | Elliot, Jr. . |
| 4,574,078 | 3/1986 | Cortesi et al. ........................ 423/592 |
| 5,087,437 | 2/1992 | Bruno et al. ......................... 423/593 |
| 5,133,955 | 7/1992 | Raghavan et al. ................... 423/592 |
| 5,238,669 | 8/1993 | Sullivan ............................... 423/592 |
| 5,242,674 | 9/1993 | Bruno et al. ......................... 423/593 |

FOREIGN PATENT DOCUMENTS

| | | | |
|---|---|---|---|
| 300851 | 1/1989 | European Pat. Off. ............ 423/592 |
| 300853 | 1/1989 | European Pat. Off. ............ 423/592 |
| 0431404 | 6/1991 | European Pat. Off. . |
| 0449454 | 10/1991 | European Pat. Off. . |
| 701370 | 12/1940 | Germany . |
| 103033 | 6/1985 | Japan . |
| 30605 | 2/1987 | Japan ................................. 423/592 |
| 408891 | 4/1934 | United Kingdom . |
| 828728 | 2/1960 | United Kingdom . |
| 8903365 | 4/1989 | WIPO . |

Primary Examiner—Wayne Langel
Attorney, Agent, or Firm—Bruce F. Jacobs

[57] ABSTRACT

A process for the preparation of nanophase solid state materials having crystallite morphology and particle sizes in the range of from about 1 nm to 30 nm is disclosed. Novel nanophase solid state materials are also disclosed.

19 Claims, 4 Drawing Sheets

PREPARATION OF NANOPHASE SOLID STATE MATERIALS

BACKGROUND OF THE INVENTION

Nanophase materials composed of nanosize particles are used in a variety of applications to produce a variety of products. The ceramic industry frequently utilizes nanophase solid state materials to produce ceramic based products. Nanosize materials are also useful in forming thin coatings for electronic and superconducting applications. Other uses of nanophase solid state materials include catalysts, superconductors and oxides for recording media. Such nanophase materials are particularly useful in these and other applications because they can be densified by various techniques resulting in high strength materials and materials containing a relatively high percentage of the densified material. Nanophase materials are also useful in the fabrication of electronic devices since small particles calcine at lower temperatures to form continuous structures.

Co-precipitation processes are normally employed to manufacture such nanophase materials. The co-precipitation method, however, has the disadvantage of producing materials which are not exceptionally homogeneous and the reproducibility of the process is often poor and it is not a general process for the synthesis of nanophase materials. In addition, the materials produced by the conventional co-precipitation require relatively higher calcination temperatures to cause densification. Higher calcination temperatures are disadvantageous because they lead to higher defect concentrations resulting in decreased resistance to fracture. Gas phase processes have been used for synthesizing a few nanophase compounds. These processes are usually not suitable for general metal oxide syntheses. Moreover, production rates are very low.

As a result, there is a need for a process to synthesize such materials generally which is both easily reproducible and which provides nanophase solid state materials for use as ceramics, catalysts, superconductors, electronic part coatings, and the like.

SUMMARY OF THE INVENTION

Accordingly, the present invention is directed to a process for producing nanophase solid state materials such as metal and metal oxide based materials, which is easily reproducible and results in materials having crystallite morphologies and particle sizes in the nanosize range of from about 1 to 30 nanometers. The process generally comprises (1) mixing together a metal solution such as a metal salt solution and a solution containing a precipitating agent to form a mixed solution, (2) pressurizing the mixed solution, (3) passing the pressurized mixed solution into a fluidizer apparatus wherein high shear forces act on the mixed solution creating solid state materials having nanosize particles, (4) depressurizing the mixed solution so as to cause cavitation and (5) separating a nanophase solid state material from the cavitated mixed solution. Preferably, the pressures must be maintained at a pressure greater than about 18,000 psi.

The process according to the present invention preferably employs a special apparatus to carry out steps 3 and 4 in the process such as a Microfludizer, manufactured by Microfluidics Corporation of Newton, Mass. By controlling the pressure of the mixed solution before it is subjected to high shear forces in the fluidizier apparatus, the particle size of the nanophase solid state materials which are finally produced can be controlled. By increasing the pressure to about 1,000 to 50,000 psig, preferably greater than about 18,000 psig, and more preferably to about 25,000 to 50,000 psig, the particle size of the solid state materials within the mixed solution are reduced facilitating homogeneous distribution of the various metals within the solid state materials. Moreover, as a result of the cavitation that occurs, thermal calcining, which is normally carried out as a separate step in a co-precipitation process, occurs in situ when the pressures are relatively high of from about 18,000 to 50,000 psig.

The process according to the present invention is particularly suitable for producing nanophase solid state materials such as metal oxides for use as coatings in electronic and superconducting applications and as ceramic materials. Such materials can be economically manufactured in large quantities and can be densified to their maximum density at much lower calcination temperatures (100° C.–150° C.) than classically prepared materials whose crystallite sizes are much larger in the range of about 0.1 microns. The lowering of the calcination temperature is variable and very much dependent on the metal oxide being calcined.

DETAILED DESCRIPTION OF THE PREFERRED EMBODIMENTS

Figure 1:
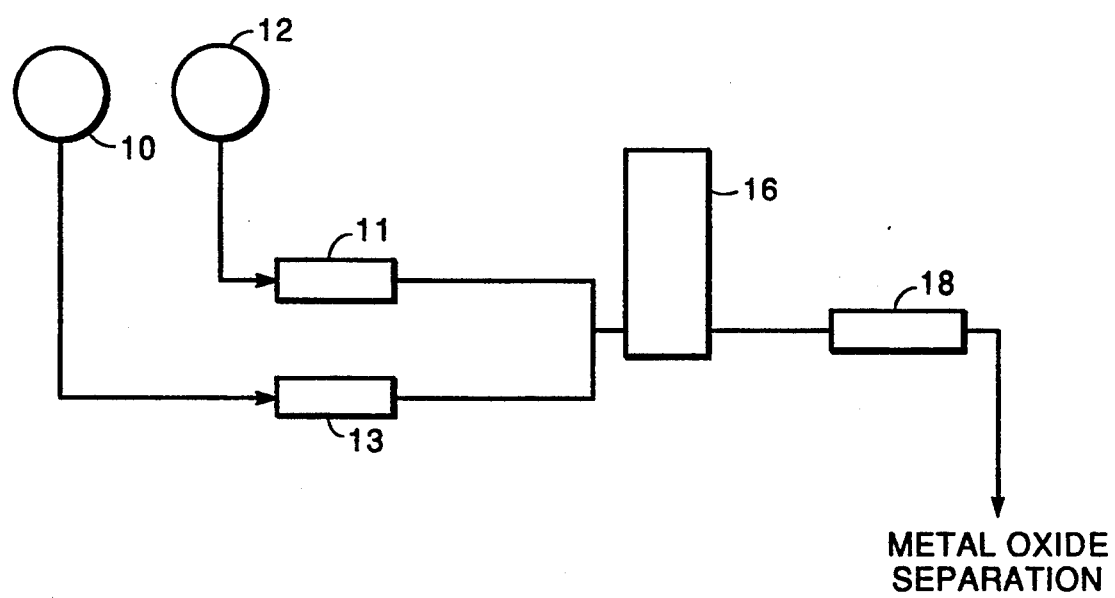
FIG. 1 is a process scheme for an embodiment of the present invention.

Referring to the drawings, one embodiment according to the present invention, a continuous process, is shown in FIG. 1. As shown, a metal containing solution such as a metal salt solution within reservoir 10 and a solution containing a precipitating agent within reservoir 12 are passed through metering pumps 11 and 12 respectively and then together forming a mixed solution just prior to entry into a high pressure pump 16. The precipitating agent solution must be maintained at a suitable pH to facilitate the precipitation of the metal ions in solution. Depending upon the metal solution and the precipitating agent, the pH generally is of from about 7.5 to 12. While pump 16 is shown outside fluidizing apparatus 18, it may be disposed within the apparatus. The mixed solution passes through the high pressure pump 16 and elevated by the action of the pump to a pressure of from about 1,000 to 50,000 psig, preferably more than 18,000 psig, and more preferably to a pressure of from about 20,000 to 50,000 psig. The pressure employed will depend upon the end product and the particle size which is desired. Generally, as the pressure is increased the particle size of the metal components is decreased.

The mixed solution at a high pressure is then channeled into fluidizing apparatus 18. Within apparatus 18 the mixed solution is vigorously mixed. This preferably takes place within the apparatus by dividing the mixed solution into two streams and then recombining the two streams by redirecting them so that they collide with each other. At the point of the collision, the mixed solution undergoes vigorous mixing and high shear while and high shear simultaneous returning to atmospheric pressure. As the pressure drops rapidly from above about 1,000 psig to atmospheric pressure, bubbles form within the mixed solution and thereafter rapidly collapse releasing energy. The energy released when the bubbles collapse, known as cavitation, is transferred to the precipitated metal material suspended within the liquid. This rapid heat up followed by a rapid local cooling as the energy is released results in an effective high temperature calcining of the solid metal materials formed while they are in a high state of dispersion. The desired solid metal materials are then removed from solution by suitable separation techniques. Such techniques include vacuum filtration, filtration and evaporation. Filtration is generally not desirable because of the nanometer particle sizes of the nanophase solid state materials so formed. Rather evaporation of the water or solution liquid leaving the highly dispersed solid metal materials is the preferred method of separation. The materials are then dried by suitable means. In most cases, the nanophase solid metal materials are ready for use, without the need for calcining as a result of the cavitation that occurs in apparatus 18. Normally, additional calcining is not required when pressures above about 20,000 psi are employed during processing.

While any suitable apparatus may be used to achieve the vigorous mixing and cavitation, a particularly preferred device is the device disclosed in U.S. Pat. No. 4,533,254, which is incorporated herein by reference. A particularly preferred apparatus is the Microfluidizer, manufactured by Microfluidics Corporation of Newton, Mass.

Figure 2:
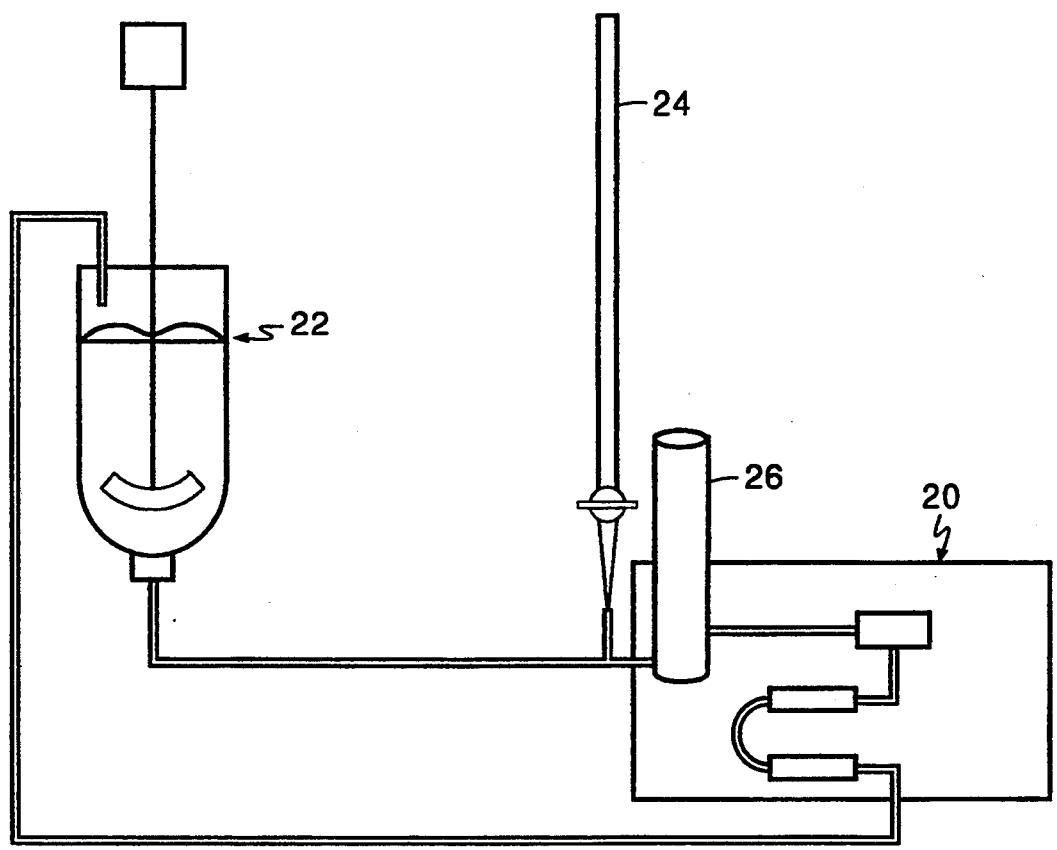
FIG. 2 is a process scheme of another embodiment of the present invention.

Another embodiment according to the present invention is shown in FIG. 2. In this embodiment a recirculation line is added to recirculate the mixed solution which has been treated in fluidizer apparatus 20. As shown, a metal salt solution disposed in reservoir 22 (Port A) is circulated and mixed with a solution containing a precipitating agent stored in reservoir 24. The two solutions are initially mixed at Port B just prior to entering a high pressure pump 26 disposed in fluidizer 20. The fluidizer apparatus 20 operates in the same manner as fluidizer apparatus 18 in FIG. 1. After undergoing vigorous mixing and cavitation in the fluidizer 20, the mixed solution is recirculated through reservoir 22. The mixed solution continues to circulate undergoing treatment within the fluidizer while the precipitating agent is gradually added generally over a period of about 30 to 40 minutes. This time can vary over this range and even outside of the range depending upon the amount of materials being mixed. The recirculation generally continues for about 10 to 40 minutes and more preferably from about 20 to 40 minutes after the complete addition of precipitating agent. The period of recirculation will depend upon the final product and desired particle size which is desired and can vary outside of the general range recited herein. The longer the period of recirculation normally translates into a final product which has a high degree of phase purity, and smaller particle size.

In another embodiment (not shown), which is presently preferred, the reservoir 22 of FIG. 2 contains precipitating agent solution and the reservoir 24 contains the metal salt solution for addition to the recirculating line. This embodiment operates in the same manner as the FIG. 2 embodiment except for the reversal of the two reservoirs. This embodiment is presently the most preferred because precipitated nanophase solid state material is recirculated so that particle sizes are further reduced during recirculation, and additional high temperature calcining in realized.

In still another embodiment, the metal salt solution and the precipitating agent solution may be premixed in a single reservoir and then passed through a pressurizing pump and then into the fluidizing apparatus. This embodiment may be employed either with or without recirculation, although recirculation is preferred to achieve nanosize materials. The first pass through mainly produces the nanophase particles, recirculation provides break up of loose agglomerates and gives additional calcining.

In certain situations; particularly when employing the process to make mixed metal oxide catalysts, it is sometimes necessary to use separate reservoirs to store the different metal salt solutions. This is because particular metal salts need particular solvents in which to be dissolved. Accordingly, different reservoirs with different solvents are required to dissolve the different metal salts. In such a situation the separate metal salt solutions are combined with the precipitating agent solution just prior to the pressurizing pump.

To synthesize the nanophase solid state materials as described herein, specific stoichiometries are required for each preparation. Generally, the metal solution stoichiometry is the same as the desired solid state metal stoichiometry.

In the embodiments where the precipitating agent is recirculated, it is desirable that the pH of the mixed solution be maintained on the basic side; i.e.; between about 7.5 to 12 and more preferably between about 8.5 to 12. However, the range is dependent on the precise solid state metal synthesized. In some cases, additional precipitating agent must be added to the recirculating mixed solution to keep the pH in the high range of about 8 to 12. In the case where the metal solution is recirculated and the precipitating agent added just before the pump, a total amount of precipitating agent is added so that the pH of the recirculating mixed solution rises slowly into the range of about 8–12.

The invention process is particularly useful in making nanophase solid state metal based materials such as metal oxides. In making such products, the metal which makes up the products are added in the form of one or more metals dissolved in a solution. Most metals are in the form of salts. However in the case of certain precious metals the metal may be added in the form of an acid such as chloroplatinic acid. Examples of suitable salts include nitrates, sulfates, acetates, chlorides, bromides, hydroxide, oxylates and acetylacetonates. The particular metals will, of course, depend on the particular product which is being made. For example, if the desired solid state material is barium titanite, a suitable metal salt solution comprises barium acetate in water and titanium tetraisopropoxide in isopropyl alcohol. In the case of zirconia, a suitable metal salt solution is zirconyl nitrate in water and a ceramic such as alumina uses aluminum nitrate. A metal oxide such as iron oxide uses metal salts such as ferric nitrate hydrate. A ceramic such as lanthana can be made from lanthanum nitrate. Magnesium oxide can be made using a metal salt solution such as magnesium nitrate.

The solutions into which the metal salt is dissolved will depend upon the particular metal salt. Suitable liquids include water, aqueous nitric acid, alcohols, acetone, hydrocarbons, chlorinated hydrocarbons, and the like.

The precipitating agent may be selected from any suitable basic material such as sodium carbonate, ammonium carbonate, potassium carbonate, ammonium hydroxide, substituted ammonium hydroxides, alkali metal hydroxides, and other basic materials which are dissolved in water or water by itself if the metal salt spontaneously reacts with water.

The products produced by the process of the invention have components which are highly dispersed throughout the composition resulting in superior phase purity as compared to the same product produced by the prior art processes. The nanophase products are composed of nanosize particles ranging in size of from about 1 to 1,000 nm, more preferably of from about 1 to 30 nm, still more preferably of less than about 10 nm, and most preferably of from about 0.1 to 3 nm. The morphology of the particles varies depending upon the material produced and can range from interlaced crystals to mixed irregular crystals to amorphous particles, thin disks (0.5 nm) and needles (10 nm).

Examples of nanophase materials according to the present invention include barium titanate, zirconia, magnesia, iron oxide, lanthana, alumina, and titania. These materials have particle sizes in the nanometer range of from about 1 to 30 nm and are crystalline.

The following Examples more specifically described the nanophase solid state materials of the present invention and the novel process of the present invention used to make such materials. These Examples discuss the electron diffraction and TEM patterns with reference to the figures showing the patterns. They also compare conventionally prepared materials with those prepared according to the process of the present invention.

EXAMPLE 1

All of the materials listed in Table II were synthesized using the process of the present invention by dissolving the appropriate salts in water and loading in the salt solution in reservoir 24 shown in FIG. 2. The salts used to make the final products are shown in Table I.

TABLE I

| Final Product | Salt |
| --- | --- |
| Alumina | Aluminum nitrate |
| Barium titanate | Barium acetate in water and titanium isopropoxide in isopropanol |
| Cobalt Oxide | Cobalt Nitrate |
| Iron Oxide | Ferric nitrate |
| Lanthana | Lanthanum nitrate |
| Magnesium Oxide | Magnesium nitrate |
| Titania | Titanium isopropoxide in isopropanol |
| Zirconia | Zirconyl nitrate hydrate |

The salt solution was then added over a period of 30 min to a recirculating solution into the microfluidizer of a basic ammonium hydroxide solution in water forming a mixed solution. The mixed solution was pressurized by pump 26 to a pressure of about 12,000 to 20,000 psig. The mixed solution then passed into the fluidizer 20 wherein it underwent cavitation. After addition of the salt solution, the recirculation was continued for 30 minutes. The resulting product was separated by evaporating the solvent on a rotary evaporator under a vacuum (pressure=40 torr).

The materials so synthesized were analyzed by XRD analysis and demonstrated no reflections at all indicating that they were either micro-crystalline, amorphous or a mixture of both. They were also analyzed by Transmission Electron Microscopy (TEM), and selected area electron diffraction (SAD). The crystallite morphologies as determined by TEM and the crystallinity as judged by SAD for each of the materials produced are listed as follows:

TABLE II

| MATERIAL | MORPHOLOGY | SIZE, nm | CRYSTALLINITY |
| --- | --- | --- | --- |
| Barium Titanate ($BaTiO_3$) | Agglomerated strands | 3–30 | Mixed crystalline mainly amorphous |
| Zirconia ($ZrO_2$) | Crystallite agglomerated strands | 2–10 | Mixed Crystalline and amorphous |
| Cobalt Oxide (CoO) | Disks 40–580 | 2–10 | Crystalline |
| Magnesium Oxide (MgO) | Disks (thin) | 10–60 | Crystalline |
| Iron oxide (FeO) | Irregular | 1–3 20 × 260 | Crystalline Crystallites (about 5%) |
| Lanthana ($La_2O_3$) | Needles | 1 × 60 | Mixed crystalline and amorphous |
| Alumina | — | — | Amorphous but possible extremely small crystals |
| Titania ($TiO_2$) | Irregular | 1–6 | Crystalline (Processed at 20,000 psi) |

All materials gave distinct ring patterns from the selected area election diffraction analysis. The samples of zirconium, cobalt, magnesium, iron, lanthanum and titanium oxides gave strong ring patterns. These ring patterns were compared to computer generated ring patterns which calculated the patterns based on the lattice parameters and structures for all known structures for each composition. This technique permitted the definitive identification of the materials synthesized as $ZrO_2$ (tetragonal or cubic), CoO (cubic), $Fe_2O_3$ (cubic), and $TiO_2$ (Anatase). This comparison between measured patterns and calculated patterns permitted the definite exclusion of FeO and $Fe_3O_4$ for the iron oxide, $Co_2O_3$ for the cobalt oxide, and $TiO_2$ (brookite) and $TiO_2$ (rutile) as possible structures for the titanium oxide. The barium-titanium oxides gave weak rings and moderately strong amorphous reflections as did the lanthanum oxide. However, these materials could be assigned to $BaTiO_3$ and $La_2O_3$.

Figure 3:
FIGS. 3–5 are electron diffraction patterns of FeO (FIG. 3), MgO (FIG. 4) and titanium oxide (anatase) (FIG. 5).
Figure 4:

The selected area microdiffraction (SAD) patterns taken by TEM analysis for iron oxide are shown in FIG. 3 and for magnesium oxide in FIG. 4. These data demonstrate that the nanophase materials are crystalline. The ring pattern in the SAD analysis prove they are crystalline. The particle size and morphology were determined by TEM photographs taken at 100,000 magnification. Studies which produced $TiO_2$ at continuously increasing process pressures from 9,000 to 20,000 psi showed that, as the pressure increased the electron diffraction patterns for $TiO_2$ (anatase) became sharper and more distinct indicating a higher degree of nanophase micro-crystallinity. The TEM analysis over this pressure range showed the production of smaller particles as the pressure increased.

EXAMPLE 2

This examples illustrates the use of the process of the invention to synthesize ceramics as nanometer size micro-crystallites. It further demonstrates that through increasing the intensity of the cavitational effect the high temperature phases may be obtained directly from the process without any post process calcination. In each of these experiments the intensity of the cavitational effect was adjusted (1) by increasing the pressure within the cavitational chamber and (2) by changing the commercial Microfluidizer device used to produce the cavitation from the larger to the smaller flow channel orifice.

This example demonstrates the production of titanium oxide in a range from moderate sized particles to the very fine, nanometer sized particles of this invention by adjusting the cavitational process conditions. In addition, other adjustments in the process conditions showed that a high temperature calcination could be effected in situ in the solution undergoing the cavitational effect resulting in a high temperature form of $TiO_2$. The results of these syntheses were compared to classical co-precipitation preparations.

The process utilized 26.5 mL of titanium tetrabutoxide dissolved in 30 mL of hexane. This solution is reactive in air, and it was loaded into a burette in a dry box and protected from the atmosphere by a nitrogen atmosphere when load into the Microfluidizer at Port A shown in FIG. 2. Distilled water, 200 mL, containing 1 wt. % Tween, a commercial surfactant (Aldrich Chemical Company) was placed in the reservoir at Port B of FIG. 1, and this solution was circulated through the fluidizer at pressure of 20,000 psi. In this case the water of the solution rapidly reacts with the alkoxide to form $TiO_2$. The titanium butoxide solution was added to the recirculating solution of 1.5–2.0 mL per minute. After the addition was completed, the solution was recirculated for 40 minutes. Two experiments were carried out at 20,000 psig but using two different flow channels of the Microfluidizer device in the cavitation generation section of the fluidizer. The solids produced in each instance were removed using 0.2 micron filter paper by repetitively passing the filtrate through a filter pad. Initially most of the solids passed through the filter. The final drying was done at room temperature and then heated at 80° C. for 10 hours.

Figure 5:
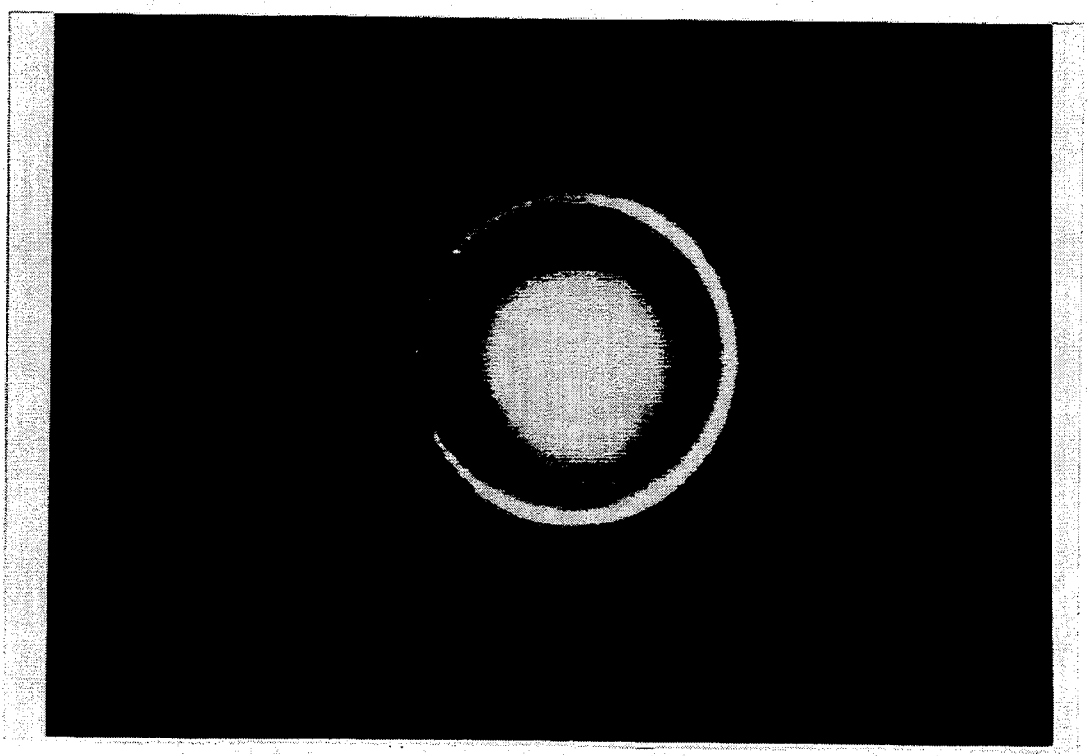
Figure 6:
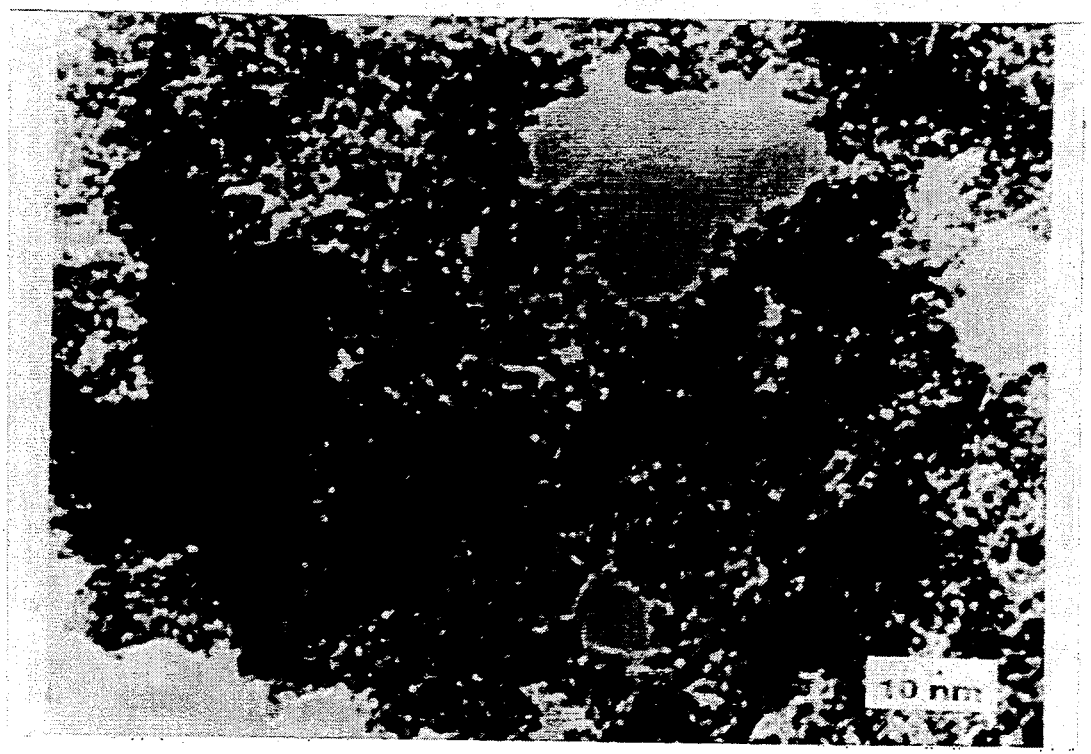
FIG. 6 is a TEM picture of $TiO_2$ (anatase) at a magnification of 200,000.

The XRD of the material produced by use of the smaller flow channel orifice in the cavitational section of the fluidizer demonstrated very low intensity and broad reflections at diffraction angles consistent with the anatase form of $TiO_2$. The transmission electron microscopic evaluation (TEM) is shown in FIG. 6 and indicates that the average particle size of the microcrystallites was 4.5 nanometers. The material was shown to be crystalline by the selected area microdiffraction (SAD) patterns of FIG. 5. Also an analysis of the electron diffraction ring pattern showed that reflections appeared at d-spacings of 3.48, 2.37, 1.93, 1.66, and 1.45 A. The JCPDS file standard spectrum indicates that reflections at 3.52, 2.37, 1.89, 1.67, and 1.48 A corresponds to the anatase form of $TiO_2$. This method of cavitational processing yielded a high temperature form of titania, namely anatase, by adjusting the processing (Microfluidizer device operating) conditions.

The experiment using the larger flow channel orifice into the cavitational chamber also resulted in a microcrystalline titania phase as demonstrated by SAD analysis. However, the phase of the titania is unknown as it exhibited reflections at d-spacings of 3.26, 2.49, 2.00, 1.74, and 1.45 A. The average particle size of the titania in this experiment was 10.0 nanometers.

Titania was synthesized in parallel experiments using classical methods of synthesis. In this synthesis, the same amounts and concentrations of reagents were used. The difference in the synthesis was that the titanium tetrabutoxide solution in hexane was added dropwise at the same rate as in the cavitational synthesis, but the addition was to the 1% Tween in water solution in a well-stirred reaction flask. The TEM analysis of this material showed that it was not microcrystalline, and the XRD pattern showed no reflections between 10 and 50 degree two theta. Thus an amorphous material was produced.

EXAMPLE 3

The same cavitational synthesis as described in Example 2 was performed except that the pressure within the cavitation chamber was varied, i.e. 9,000, 13,500, 18,000, and 20,000 psig. When the respective samples were analyzed by Scanning Electron Microscopy (SEM), it was observed that the particle size of the solid titania was gradually reduced as the cavitation process pressure was increased. The largest particles in the four preparations were 70 nm at 9,000 psig, 24-nm at 13,500 psig, 10 nm at 18,000 psig, and 5 nm at 20,000 psig. These particle sizes were those of agglomerated microcrystals. The agglomerate particle size at 20,000 psig using the smaller flow channel orifice in the cavitation chamber resulted in agglomerated particles of 0.2 nm. TEM analysis of the samples showed that the individual particles that make up the agglomerates decreased in size as the cavitational pressure was increased. XRD analysis of the samples resulting from this pressure series showed no discrete peaks at low pressures and low intensity broad peaks as the pressure increased. This synthesis series demonstrates that the particle size of cavitationally prepared materials may be altered in a controlled way through the adjustment of process parameters.

What is claimed is:

1. A process for producing nanophase solid state materials comprising (1) mixing together a metal containing solution and a second solution containing a precipitating agent to form a mixed solution, (2) pressurizing the mixed solution to a pressure of about 1,000 to 50,000 psig, (3) passing the pressurized mixed solution into a fluidizing apparatus wherein high shear forces act on the mixed solution, creating nanophase solid state materials having nanosize particles having average sizes of from about 1 to 30 nm, (4) depressurizing the mixed solution so as to cause cavitation and (5) separating the nanophase solid material from the cavitated mixed solution.

2. The process of claim 1, wherein the pressure is of from about 25,000 to 50,000 psig.

3. The process of claim 1, wherein the metal containing solution and the precipitating agent containing solution are mixed prior to passage into the fluidizing apparatus.

4. The process of claim 1, wherein the mixed solution is recycled through the fluidizer apparatus.

5. The process of claim 4, wherein the precipitating agent solution is added to the mixed solution as it is recycled.

6. The process of claim 4, wherein the metal containing solution is added to the mixed solution as it is recycled.

7. The process of claim 1, wherein the metal containing solution and the precipitating agent solution are mixed together as they enter the pressurizing pump.

8. The process of claim 1, wherein the metal containing solution is a metal salt solution.

9. The process of claim 1, wherein the salt is selected from the group consisting of nitrate, acetate, chloride, sulfate and bromide.

10. The process of claim 1, wherein the average particle size is less than about 10 nm.

11. The process of claim 1, wherein the average particle size is about 1 to 3 nm.

12. The process of claim 1, wherein the solid state material is crystalized.

13. The process of claim 1, wherein the metal containing solution and the precipitating agent solution are mixed together in a separate vessel.

14. A process for producing a calcined nanophase solid state material comprising (1) mixing together a metal containing solution and a second solution containing a precipitating agent to form a mixed solution, (2) pressurizing the mixed solution to a pressure of about 20,000 to 50,000 psig, (3) passing the pressurized mixed solution into a fluidizing apparatus wherein high shear forces act on the mixed solution, creating nanophase solid state materials having nanosize particles having average sizes of from about 1 to 30 nm, (4) depressurizing the mixed solution so as to cause cavitation and calcination, and (5) separating the calcined nanophase solid material from the cavitated mixed solution.

15. The process of claim 14, wherein the metal containing solution and the precipitating agent containing solution are mixed prior to passage into the fluidizing apparatus.

16. The process of claim 14, wherein the mixed solution is recycled through the fluidizer apparatus.

17. The process of claim 16, wherein the precipitating agent solution is added to the mixed solution as it is recycled.

18. The process of claim 16, wherein the metal containing solution is added to the mixed solution as it is recycled.

19. The process of claim 14, wherein the metal containing solution and the precipitating agent solution are mixed together as they enter the pressurizing pump.

* * * * *